United States Patent
Hollander

[15] 3,691,330

[45] Sept. 12, 1972

[54] TRAILER BREAK AWAY SWITCH MOUNT

[72] Inventor: Irvin Hollander, 30 Knollview Place, Dayton, Ohio 45405

[22] Filed: Oct. 1, 1971

[21] Appl. No.: 185,635

[52] U.S. Cl. ............................... 200/61.19, 188/112
[51] Int. Cl. ........................................ H01h 27/04
[58] Field of Search ....200/61.19; 188/112; 340/222, 340/52 R

[56] References Cited

UNITED STATES PATENTS 3,060,407  10/1962  Beiswenger ................. 340/282
3,062,326  11/1962  Jones et al. ......... 200/61.19 X

*Primary Examiner*—Robert K. Schaefer
*Assistant Examiner*—M. Ginsburg
*Attorney*—Jerome P. Bloom

[57] ABSTRACT

Apparatus comprising an improved mount for a break away switch and a battery box to the chassis or hitch frame of a trailer type vehicle. The mounting bracket protectively retains the switch for selective angular disposition relative the trailer vehicle and has a functional relation to the battery box.

10 Claims, 6 Drawing Figures

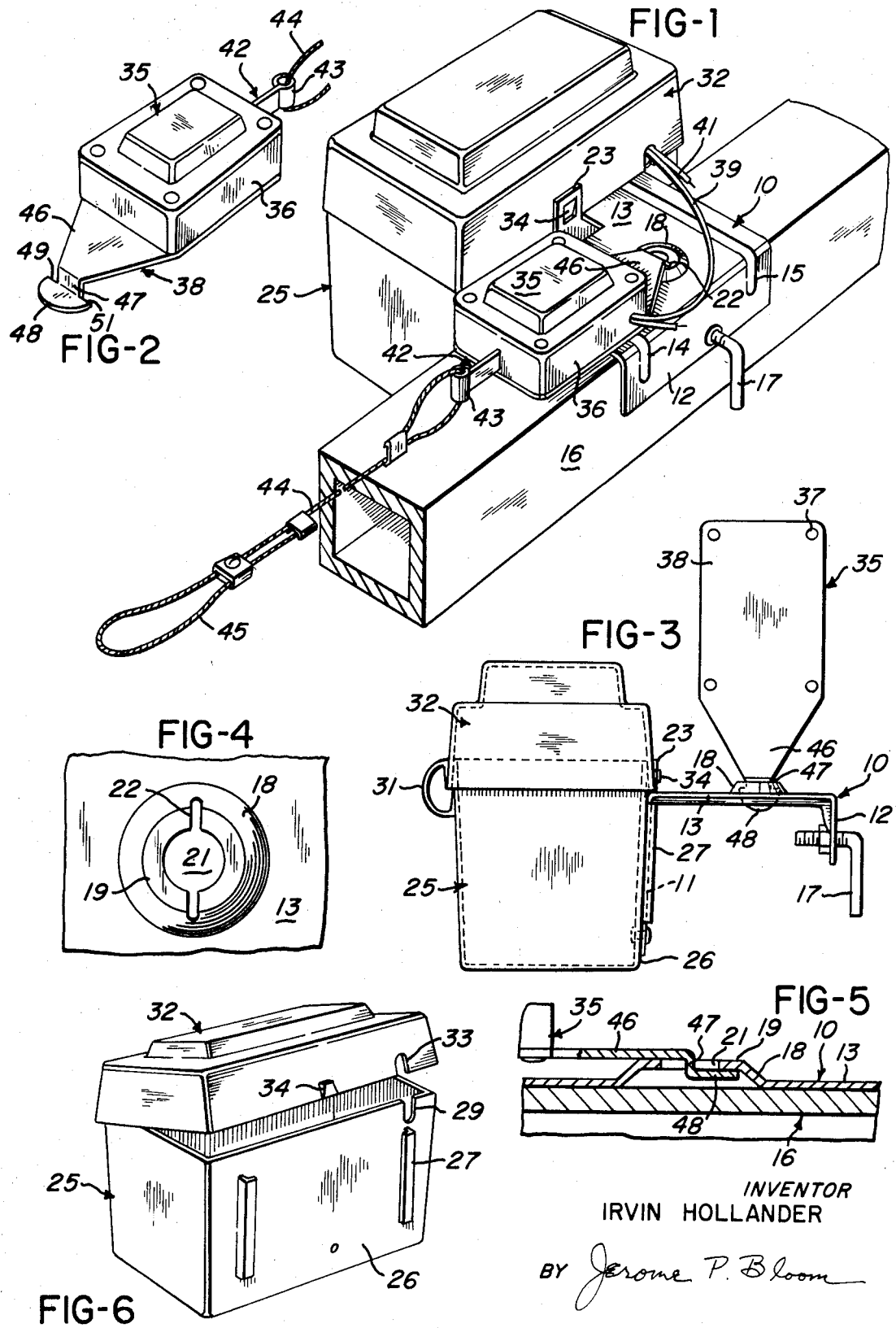

TRAILER BREAK AWAY SWITCH MOUNT

BACKGROUND OF THE INVENTION

This invention relates to a novel kit for mounting a break away switch to the chassis or hitch frame of a trailer type vehicle. It provides a functional interrelation between a mounting bracket, the switch and a battery box enabling an improved and more protective control system for the automatic braking of the related vehicle, as and when required.

Control assemblies of the class to which this invention relates have as their objective a means to provide an immediate braking of a related trailer type vehicle when its towing vehicle is inadvertently separated. The actuation of the control circuit for producing the automatic braking of the towed vehicle is under the sole control of a break away switch. Accordingly, the safe, secure, yet accommodating mount thereof to meet all conditions and requirements of use is critical. It is also important that the necessary controls be compactly mounted and that there by maximum protection and security in the mount of a battery to power said control circuit.

Heretofore the mounting of the break away switch and the related battery have left something to be desired. In some cases the elements of the braking control system such as afforded by the invention have been provided in separate component forms such that the switch and the battery elements thereof have required their individual mounting on the towed vehicle. This has been disadvantageous from the standpoint of lending itself to awkward disposition of the elements by inexperienced personnel and possible malfunction of the system as a result thereof. An additional problem evidenced in the prior art has been in the nature of the mount and the inadequate protection of the battery so essential to providing the necessary power source for the braking system. Furthermore, the mounting heretofore provided for break away switches in the prior art apparatus of the class described has been inadequate to prevent tampering and inadvertent loss of the switch. In many instances the nature of the switch mount has been such that it has been too rigidly fixed, leading to incidents of premature braking of the related vehicle. It has also happened that the switch mount was too free and did not function when required.

SUMMARY OF THE INVENTION

The present invention is directed to overcoming the above mentioned problems in the related art. It provides for a compact and secure incorporation in a trailer type vehicle of a break away switch and a battery. The switch is so mounted to be selectively positionable for alignment with a towing vehicle through the medium of an actuating cable. Nevertheless, the switch is contained against inadvertent removal or displacement. While accommodating a degree of misalignment between the towing and the towed vehicle, movements of the switch are limited to insure its actuation in the event of an actual separation in the hitch between the towing and the towed vehicle.

In a preferred physical embodiment, the invention provides a switch mounting bracket incorporating simplified fastening means for a quick and easy attachment thereof to the trailer chassis or hitch frame. The bracket is so designed as to interconnect therewith and functionally relate to a box or receptacle for protective retention of a battery.

The invention embodiments to be here illustrated features simplicity, economy of fabrication and an inherent ability to inhibit malfunction in a break away control between a towing and a towed vehicle.

It is therefore a primary object of the invention to provide a new and improved assembly of the primary components necessary to provide a break away control between a towing and a towed vehicle which is economical to fabricate, more efficient and satisfactory in use, adaptable to a wide variety of applications and unlikely to create malfunction.

Another object of the invention is to provide for mounting of a switch unit in a break away control assembly disposed between a towing and a towed vehicle in which the switch will accommodate selective positioning within a normal range of displacement between a towing and a towed vehicle without danger of malfunction.

A further object of the invention is to provide a mounting device for a break away switch incorporated in an automatic braking system for a towed vehicle which inherently secures the switch against inadvertent detachment from the towed vehicle and inhibits tampering while enabling the switch to accommodate an adjustment in position without actuating the related braking system except as and when needs require.

Still another object of the invention is to provide a break away control assembly, the components of which are constructed for weather and impact resistance and which combine features of integration and security with an adjustability lending versatility to the mounting and use of the assembly.

An additional object of the invention is to provide a break away control assembly for mounting to a trailer type vehicle and components thereof possessing the advantageous structural features, the inherent meritorious characteristics and the means and mode of use herein described.

With the above and other incidental objects in view as will more fully appear in the specification, the invention intended to protected by Letters Patent consists of the features of construction, the parts and combinations thereof, and the mode of operation as hereinafter described or illustrated in the accompanying drawings, or their equivalents.

Referring to the drawings wherein are shown one but not necessarily the only form of embodiment of the present invention, FIG. 1 is a perspective view showing a break away control assembly in accordance with one embodiment of the invention, in an installed position;

FIG. 2 is a detailed view in perspective of the switch unit comprised in the assembly of FIG. 1;

FIG. 3 is a side view of the control assembly of FIG. 1;

FIG. 4 is a fragmentary top plan view of a bracket comprised in the control assembly, showing mounting means for the switch unit;

FIG. 5 is a fragmentary view in cross section, showing the switch unit lockingly positioned in the mounting bracket; and FIG. 6 is an open perspective view showing features of the battery box embodied in the control assembly.

DESCRIPTION OF A PREFERRED EMBODIMENT

Referring to the drawings, a break away control assembly in accordance with the illustrated embodiment of the invention includes a mounting bracket 10 which may be made of a rigid durable plastic material but which in the illustrated instance is a formed metal part suitably coated or plated to be corrosion resistant. The bracket 10 is a flat sheet-like member of rectangular configuration, the opposite ends of which are turned down differential distances to form a long leg 11 and a shorter leg 12 dependent from the respective ends of an intermediate generally planar web section 13. Beads 14 and 15 are formed along side margins of the bracket 10 to impart greater strength and rigidity to the substance thereof. In cross section, the bracket 10 has an inverted U-shape and is adapted to fit over a mounting bar 16 square in cross section and forming a part of the hitch frame or other stationary chassis part of a towed vehicle. As mounted, the legs 11 and 12 achieve an embracing relation to opposite side faces of the bar 16 while the planar web portion 13 seats substantially flush to the top surface of the bar. The relatively shorter leg 12 of the bracket 10 has a threaded aperture in which is mounted an angle shaped screw member 17. As will be self-evident, the screw member 17 is relatively rotatable to advance one end upon and to retract the same from a side surface of the bar 16 in a manner to cause bracket 10 to be fixed to the bar or to be released therefrom.

In a central location in the web 13, a deformed portion is displaced outwardly from the plane thereof and the underlying surface of bar 16 to define a concavo-convex boss 18. The latter has a truncated configuration and presents a flat planar surface extremity 19 outermost, which surface is substantially parallel to web 13. Centered in the planar surfaced extremity 19 is an aperture 21. The portion of said planar surface extremity 19 which rims the aperture has formed therein a pair of diametrically opposite notches 22, the purpose of which will be further described.

The aperture mounting screw member 17 and the boss 18 are substantially coincident of one another in a line defining introduction into to lid the longitudinal axis of the sheet-like member forming the bracket 10. In the same line but offset to an immediately adjacent relation to leg 11, a rectangular loop portion of web 13 is outstruck to form integral therewith a perpendicular vertically projected latch member 23. The member 23 disposes substantially as an upward extension of the leg 11.

The leg 11 of bracket 10 serves further as a wall support for the mounting thereto of a battery box or receptacle 25. The leg 11 is relatively reduced in width in reference to web 13, from side to side thereof, to facilitate its introduction into channel shaped guides 27 formed integral with a front wall surface 26 of the box 25, whereupon suitable means are applied to fix the wall 26 of the leg 11. The box 25 is comprised of a container and lid, the container being formed by the front wall 26 and interconnected end, bottom and back walls. The container is open at its top to accommodate the insertion therein of a battery. A notch or recess 29 formed in the upper edge of the front wall 26 of the battery container provides a wire passing opening. The open top of the battery container is capped by a lid member 32 having a dependent peripheral wall integrally connected by a section of flexible strap-like material to the back wall of the container. This integral strap forms a lie hinge 31 to the back of the container which is disposed outermost in reference to the leg 11 of the bracket 10. A notch 33 is formed in a front dependent wall portion of the lid 32 adapted to register with the notch 29 in the container wall 26. The registration of the notches 29 and 33 provides an opening accommodating the passage of such lead or leads as may be required or completing a control circuit embodying the applied breakaway switch. Further, positioned centrally on the front dependent wall portion of the lid 32 and projected outwardly therefrom is a lug 34. The latter is adapted to align with and to frictionally engage in the opening defined by the loop formed latch member 23 for maintaining the lid in a closed relation to the container portion of the battery box 25. The dependent wall portion of the lid is deflectable, as is the lug 34, and has sufficient resilience as to tend to normally project the lug for interengagement in the latch member 23. When release is desired, this is accomplished by pressing inwardly upon the dependent front wall portion of the lid, whereupon lug 34 is disengaged from the latch 23 and the lid may be raised on its integral hinge structure.

Thus, the battery box 25 is simply but effectively connected to the leg 11 of the mounting bracket 10 and, as may be seen, the nature and relation of the container and lid portion thereof which are impermeable in character is such to provide a fully protective weather-proof enclosure for a battery. Note, in particular, that the integrally hinged lid 32 is locked to the mounting bracket through the medium of the lug 34 and the latch 23. There is therefore a functional relation between the battery box and the mounting bracket to preserve the integrity of the seal provided in the containment of the battery.

The battery box or receptacle 25 may be mad of any material suitable to its intended purpose. However, preferred embodiments will be made of a molded, impact resistant, plastic. It is emphasized that in accordance with the invention all parts of the battery box will have an integrated relation to one another, the hinge 31 being unitarily integrated with the container and lid portions of the box and the guides 27 and lug 34 being formed as integral projections on surface portions of the box.

Further comprised in the control assembly of the invention is the switch unit 35. Unit 35, as shown, has a generally rectangular configuration as embodied in an external housing 36, the latter of which is also conveniently made of a plastic material and secured by bolts or rivets 37 to a mounting plate 38. In use the plate 38 forms a base for the switch unit 35 and it is therefore made of a rigid durable material which may conveniently correspond to or be the same as the material of which bracket 10 is fabricated. Positioned within the housing 36 are the net required switch elements, the details of which are unnecessary to a consideration of the present invention. Viewing the drawings, from an aperture in the side of the housing 36 project a pair of insulated electrical conductors 39 and 41. One of said conductors leads to the battery box 25 to enter the same through the opening defined by the registration of the notches 29 and 33. The other conductor is extensible from the switch unit 35 to connect into an electrical control system, in this case a braking control system for the related trailer type vehicle. Operation of the switch elements within the switch unit 35 is under the control of a key member 42 slidably installed in the switch unit and extending through and outwardly of one end of the housing 36. At its outer projecting end, key 42 is formed with an eye 43 through which one end of a flexible cable 44 is looped and so connected. The cable 44 extends from the switch unit to have the opposite end thereof, which is formed as a loop 45, to be applied in connection with a stationary part of a towing vehicle. In a manner which it is unnecessary here to consider, the key member 42, when fully inserted into the switch unit 35, maintains the switch elements therein in a predetermined position of adjustment. The key member has a detented retention within the switch unit but if sufficient pull is applied through the cable 44, it is subject to partial or complete withdrawal from the switch unit to allow the switch elements to assume an alternate control position. In this case the alternate control position will provide the actuation of controls for automatic application of the brakes in the trailer or towed vehicle.

At an end of the switch unit 35 opposite to that from which the key member 42 projects, mounting plate 38 extends beyond the adjacent end of housing 36. The projecting end of plate 38 provides a flat portion 46 coplanar with that part of the plate underlying case 36. Outwardly of the switch case, planar portion 46 tapers and at its outer or apex end terminates in an extended section 47 of uniformly reduced width. The latter in turn merges with a relatively broad tongue 48. Section 47 is bent downwardly out of the plane of the portion 46 and the tongue 48 is bent forwardly to dispose substantially parallel but in offset relation to planar portion 46. The tongue 48 has a rounded or continuously curved leading edge and formed with rearwardly facing shoulders 49 and 51 on respectively opposite sides of the reduced section 47, the latter forming a neck in a connecting relation to tongue 48 and plate portion 46.

The switch unit has the plate configuration 46–51 to facilitate its mounting in the bracket 10 and in selective positions of adjustment. This mounting of the switch unit is accomplished prior to mounting of the bracket to the bar 16. Tongue 48 of neck 47 achieves a directly cooperative relation with boss 18 in the bracket to bring about the switch mounting. In the assembly of the switch unit to the bracket 10, switch unit 35 is held substantially perpendicular to the bracket 10 and tongue 48 is inserted through the boss 18 on a diametral line defined by the notches 22, the latter of which accommodate the lateral extremities of the tongue 48 on insertion. By this means, the tongue which has a maximum width which exceeds the diameter of the aperture 21 is readily accommodated in passage through the extremity 19 of the boss 18. Neck 47 has a width approximately corresponding to the diameter of aperture 21. With the tongue 48 fully inserted through boss 18, neck 47 adjacent the tongue disposes in the plane of the projected planar portion 19, whereupon the switch unit may be turned to a selected angular position of adjustment relative to the bracket 10 and lowered in such position and to approximate parallelism with the bracket as indicated in FIG. 1. Lowering motion of the switch unit is limited by engagement of the tongue portion 48 with the underside of planar portion 19, the plate portion 46 at neck 47 limiting similarly against the planar portion 19 on the exterior or outer surface thereof. The unbalanced weight of the switch unit is thus applied in a manner to urge tongue 48 upwardly against bracket portion 19, whereupon the side edges of neck portion 47 substantially contact the inner edge of aperture 21. Thus, tongue 48 is completely received within the boss 18 of the bracket 10 and, in the installed portion of the assembly, is secured against detachment, since to remove the switch unit it must be free to be tilted back to a perpendicular position so the tongue may be withdrawn vertically in line with and through the notches 22.

In assembling the several components of the break away control device, the screw member 17 is installed in mounting bracket 10 by being rotated into its aperture in the leg 12. Bracket leg 11 is inserted in the guides 27 therefor defined on the front wall 26 of the container portion of the battery box 25. For security, a rivet or other means of attachment is used to fix the front wall of the battery receptacle to the leg 11. Switch unit 35 is tilted into a vertical position in respect to the bracket web portion and the tongue 48 inserted on a line through notches 22 in the boss 18 of bracket 10. The switch unit may be then selectively positioned angularly of the bracket depending on its desired orientation in place. The position the switch unit will normally assume will be one substantially parallel to the battery box 25, with the switch unit assuming either the opposition shown in FIG. 1 or a position 180° displaced therefrom, according to the attitude of the bracket 10 in the mounting thereof to a bar 16. The arrangement normally will be one to substantially align the switch unit with the towed and towing vehicles so that when a pull is exerted through the cable 24 from the towing to the towed vehicle, the pull will be substantially axial in relation to the key member 42. Note that this will obviate the chances of damage to the switch unit in break away action. Considering further the assembly, bracket 10 is then mounted to a support bar 16 and the screw member 17 turned to lock the assembly in place thereon. In mounting the bracket 10 to the bar 16, web portion 13 seats in a substantially flush manner to the upper surface of the support bar which accordingly provides a bottom wall in enclosing relation to the underside of boss 18. The tongue 48 is accordingly then contained and locked within the boss. It is prevented by the underlying support bar from tilting to a position necessary to enable withdrawal of a tongue through the boss. The switch unit is accordingly securely held against inadvertent or unauthorized removal from the assembly and cannot be detached except as part of an operation detaching the entire assembly. Once the assembly is applied to the bar, a battery may be inserted in the container portion of the box 25 and the lid closed thereon, automatic latching of the lid then taking place, by virtue of the resilient interconnection of lug 34 in the latch loop 23.

In connecting the control assembly to operating parts of the towed and towing vehicles, key member 42 is inserted fully within the switch unit 35 and cable 44 extended therefrom and attached to a fixed location on the towing vehicle. The electrical conductors 39 and 41 are appropriately applied in a conventional manner to incorporate the battery and the switch in a control system applicable to the brakes of the related trailer type towed vehicle. Since the details of the circuit are not necessary to an understanding of the invention, they are not further described. Suffice it to say that on pulling of the key member 42 outwardly of the switch unit 35, in the case of an inadvertent separation of the towing from the towed vehicle, the switch will function to cause the related circuit to function in a manner to produce an application of the trailer brakes.

Note the mount of the switch to the boss 18 is such to permit limited rotative displacement such as necessary to accommodate slight misalignment of the towed and the towing vehicle. Yet excessive freedom of turning movement of the switch unit is inhibited by virtue of the relationship of the neck 47 and the notches 22 in the boss portion 19. It will be seen that the relatively close fit of neck 47 and aperture 21 enables that where there is a lateral force applied in turning of the switch side edges of the neck will engage in and limit against the respective edges of the notches 22. Thus, there is a limited accommodation and defined limits in respect to turning movement of the switch unit 35 relative its mounting medium. The net result will be a sure and certain and relatively direct pull on the key member 42 as an immediate consequence of an undue separation or dangerous misalignment of the towed and towing vehicle.

In summary, the invention achieves a simple but effective improvement in assemblies available for application of break away control switches to trailer type or towed vehicles.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statue the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

Having thus described my invention, I claim:

1. Break away control apparatus for installation between towed and towing vehicles, the towed vehicle having an electrically controlled braking system: comprising a bracket for mounting in connection with one vehicle, a battery box carried by said bracket, a switch unit carried by said bracket and differentially positionable thereon, said switch unit and a battery when inserted in said battery box providing means adaptable for connection thereof to provide a control for the electrically controlled braking system, and said switch unit including a switch actuating member adaptable for attachment thereof to the other of said vehicles.

2. Apparatus according to claim 1 characterized by means for detachably mounting said bracket to the towed vehicle, said bracket and said battery box and said switch unit being interrelated and forming an assembly attachable and detachable as a unit with respect to the towed vehicle.

3. Apparatus as in claim 1 characterized by the application of said bracket and said switch unit in assembled relation producing a containment of said switch unit to a structure to which said bracket is mounted.

4. Apparatus according to claim 3 wherein said bracket presents an undersurface portion of which is adapted for flush mating contact with a surface of the structure in connection with said towed vehicle and another portion of which is displaced from said surface, said another portion having an opening therein, said switch unit having a portion insertable through said opening and upon insertion adapted to be contained for limited movement within and with respect to said displaced portion.

5. Apparatus according to claim 4, characterized by said displaced portion forming a boss on the upper surface of said bracket, said boss having an aperture intersected by diametrically aligned notches, said insertable switch portion providing a tongue having a relatively wide extremity to be inserted on a line through said notches and a relatively narrow neck portion to be accommodated in the aperture in said boss, said tongue being adapted to be received in said displaced portion to be confined therein by the application of said bracket to the said surface of the towed vehicle.

6. Apparatus according to claim 1, wherein said bracket provides a relatively broad flat planar section a localized portion of which has a concavo-convex configuration intersected by transverse slots, said switch unit having a projecting mounting flange terminating in a tongue in a substantially offset parallel relation to the flange and connected thereto by a reduced neck portion, said switch unit in a substantially perpendicular attitude relative to said bracket positioning said tongue for insertion through said slots from the convex side of said localized portion of said bracket section, said tongue in a lowered attitude of said switch unit disposing substantially parallel to said planar section of said bracket and being lockingly received in said concave side of said localized portion of said bracket.

7. Apparatus according to claim 1, wherein said bracket has a channel shape presenting substantially parallel legs interconnected at their one ends by a transverse web portion, one of said legs providing a panel for attachment of the battery box thereto and said transverse web portion being formed with means for the attachment of said switch unit thereto in selected angular positions of adjustment.

8. Apparatus according to claim 7, wherein said bracket is constructed to mount on a part of the towed vehicle of substantially complementary configuration, the other leg of said bracket carrying means to tighten and to release said bracket relatively to said part.

9. Apparatus according to claim 7, wherein said battery box has a lid, portion of said transverse web of said bracket being outstruck therefrom to form a detent in cooperation with a portion of the lid of said box yieldingly to hold said lid closed.

10. Apparatus according to claim 9, wherein said battery box and lid are formed as a unitary molded plastic or like article, the lid and box being interconnected by an integrally formed hinge.

* * * * *

UNITED STATES PATENT OFFICE
CERTIFICATE OF CORRECTION

Patent No. 3,691,330    Dated September 12, 1972

Inventor(s) Irvin Hollander

It is certified that error appears in the above-identified patent and that said Letters Patent are hereby corrected as shown below:

Col. 1, line 22, "by" is corrected to read -- be --.

Col. 2, line 45, insert "be" following -- to --.

Col. 3, line 48, delete "introduction into to lid".

Col. 3, line 63, "to" is substituted for -- of --.

Col. 4, line 7, "lid" is substituted for -- lie --.

Col. 4, line 44, "made" is substituted for -- mad --.

Col. 6, lines 37-38, "position" is substituted for -- opposition --.

Signed and sealed this 13th day of February 1973.

(SEAL)
Attest:

EDWARD M. FLETCHER, JR.            ROBERT GOTTSCHALK
Attesting Officer                  Commissioner of Patents